J. A. L. WALMAN.
EYE TESTING MACHINE.
APPLICATION FILED MAY 25, 1915.

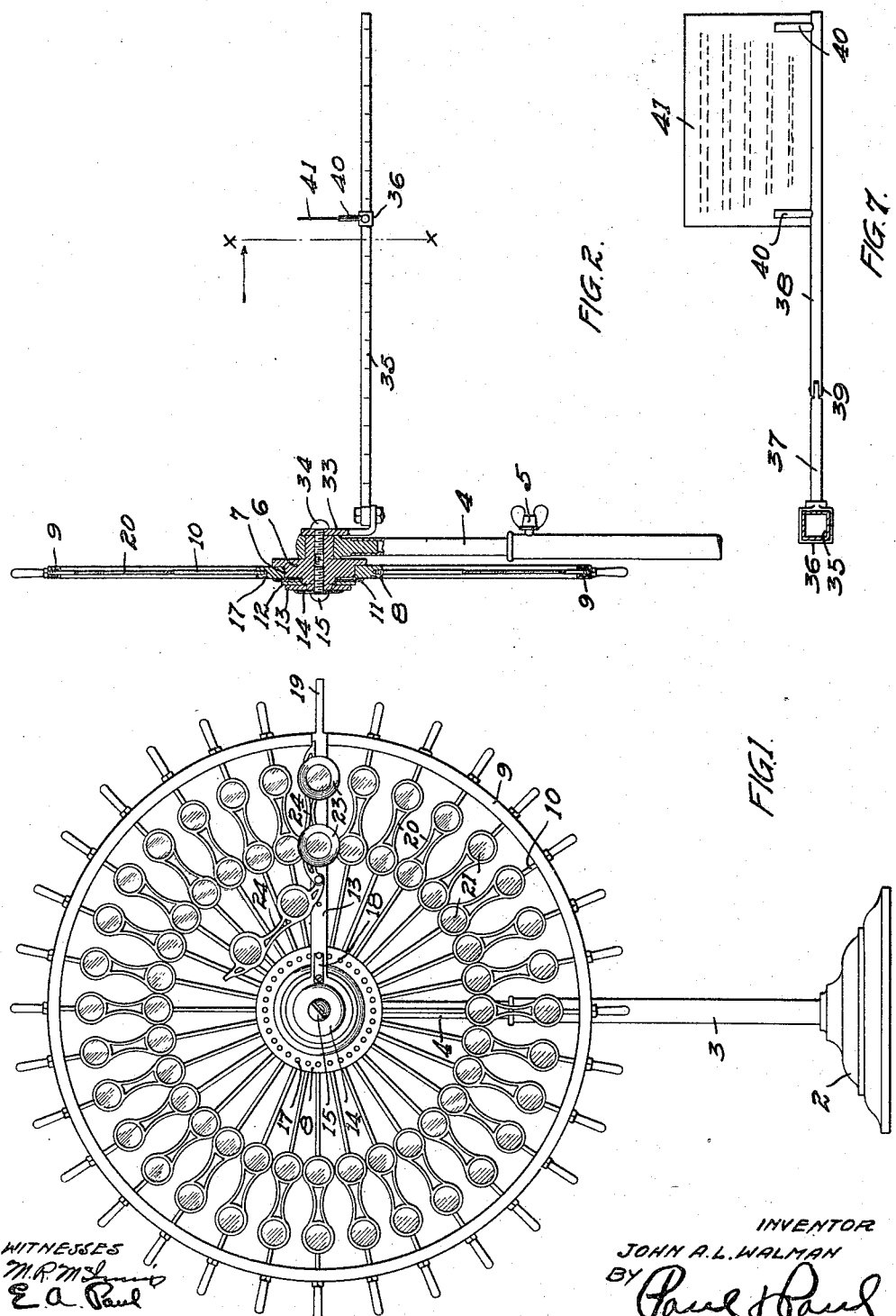

1,201,657.

Patented Oct. 17, 1916.
2 SHEETS—SHEET 2.

WITNESSES
M. R. McInnis
E. A. Paul

INVENTOR
JOHN A. L. WALMAN
BY
Paul & Paul
ATTORNEYS

UNITED STATES PATENT OFFICE.

JOHN A. L. WALMAN, OF MINNEAPOLIS, MINNESOTA.

EYE-TESTING MACHINE.

1,201,657.   Specification of Letters Patent.   Patented Oct. 17, 1916.

Application filed May 25, 1915. Serial No. 30,258.

*To all whom it may concern:*

Be it known that I, JOHN A. L. WALMAN, citizen of the United States, resident of Minneapolis, county of Hennepin, State of Minnesota, have invented certain new and useful Improvements in Eye-Testing Machines, of which the following is a specification.

My invention relates to optometers for the use of oculists and opticians, or a machine having its lenses arranged in pairs. I prefer to designate it as a binoptometer.

The object of my invention is to provide a machine of comparatively simple construction and one which can be easily operated.

A further object is to provide a machine of this type having a large capacity for the insertion of lenses during the eye testing operation.

Other objects of the invention will appear from the following detailed description.

The invention consists generally in various constructions and combinations, all as hereinafter described and particularly pointed out in the claims.

Figure 3:
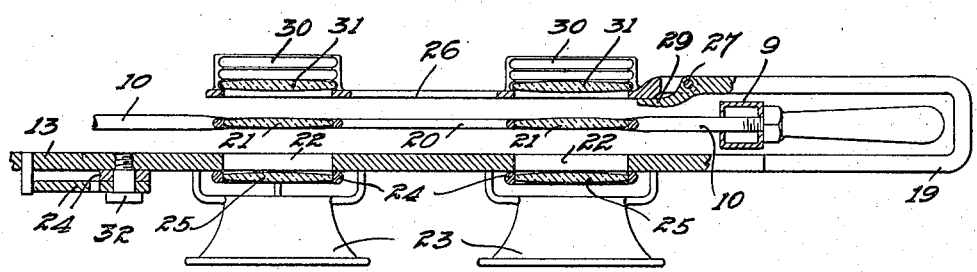
Figure 4:
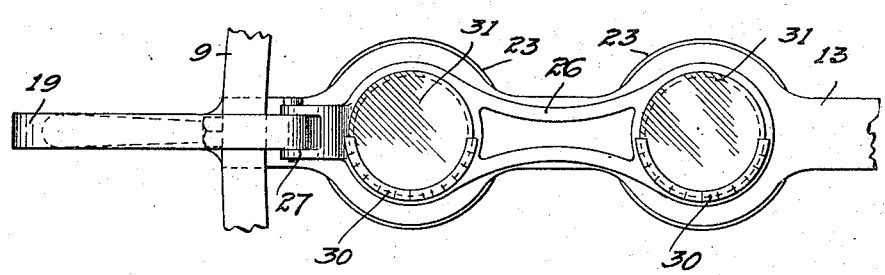
Figure 5:
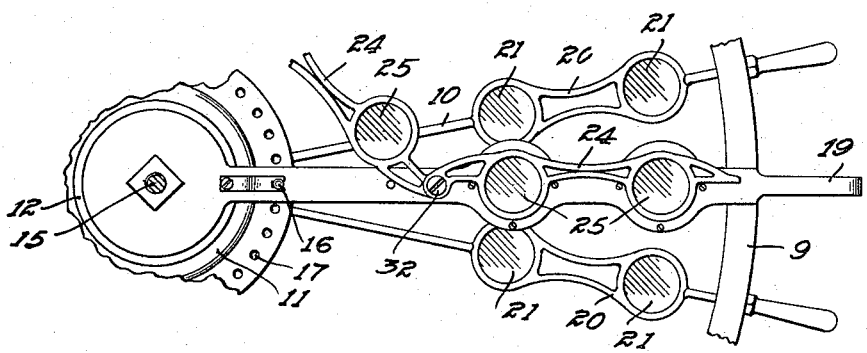
Figure 6:
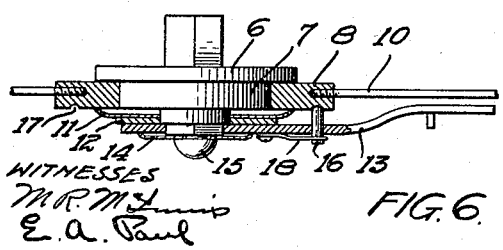

In the accompanying drawings forming part of this specification, Figure 1 is a front elevation of an eye-testing machine embodying my invention, Fig. 2 is a vertical sectional view of the same, Fig. 3 is a sectional view through the lens carrier, showing the relative position of the lenses, Fig. 4 is an enlarged detail view of the lens holder, Fig. 5 is a detail view, showing the manner of mounting the lens holder, Fig. 6 is a detail view, showing the spring device for holding the carrier against premature movement, Fig. 7 is a detail sectional view, illustrating the support for the testing sheet, taken on the line $x$—$x$ of Fig. 2.

In the drawing, 2 represents a suitable base having a hollow standard 3 mounted thereon in which a rod 4 is slidable and secured by suitable clamping means, such as a thumb screw 5. At the top of the rod 4 is a hub 6 having a bearing 7 for a wheel which consists of an inner ring 8 and an outer ring 9 connected with one another by suitable spokes 10. A spring washer 11 bears on the ring 8 and is centered on one end of the hub 6 and a washer 12 is seated on the washer 11 and is held in place by the spring arm 13 which in turn is secured by a spring washer 14 and a screw 15 which is tapped into one end of the hub 6. A pin 16 is mounted in the arm 13 and has a rounded end to enter depressions 17 in the ring 8 and is yieldingly held in said depressions by a spring 18. The arm 13 has an extension 19 at its outer end that is carried around the periphery of the ring 9 and backwardly, parallel with the main portion of the arm toward the center of the wheel but on the opposite side of the ring 9. The space between the extension 19 and the main portion of the arm 13 is sufficient to allow the wheel to revolve freely. The spokes 10, of which there may be any suitable number in the wheel, are each provided with a frame 20 to receive lenses 21 of different degrees of refraction used in testing the eyes. The arm 13 is provided with openings 22 therein arranged to register with eye pieces 23 and lens holders 24 are provided between the eye pieces and the holes 22 to receive the lens 25. A frame 26 for lenses 31 is hinged at 27 on the arm 19 and adapted to be swung inwardly or outwardly to an operative or inoperative position. A stop 29 limits the inward movement of this frame. The lenses 21 are mounted to register with the lenses 25 as the wheel is revolved and as the depressions 17 are located opposite the inner ends of the spokes, these spoke lenses will, when the wheel is at rest, be always in position to register with the lens in the arm 13. The frame 26 has a plurality of lens seats 30 therein for lenses 31 so that a number of these lenses may be placed therein, one in front of another, as may be desired in obtaining the desired ocular test.

The lens holders 24 are pivoted at 32 on the frame 13 and adapted to swing in between the eye pieces 23 and the holes 22 in the arm 13 when the oculist desires to make further test of the eyes without the necessity of changing the lenses already in the machine. These lenses in the frame 24 may be of different degrees of refraction from the lens 21 and enable the oculist to obtain a wider range of adjustment without the insertion of new lenses in the machine, or changing the position of the lens carrier. When this lens frame 24 is made use of, and there may be one or more, the frame 26 may be swung around to an inoperative position. A bracket 33 is secured by a screw 34 to the other end of the hub 6 and on this bracket a graduated arm 35 is mounted. A slide 36 is mounted on this arm and is provided with a short standard 37 to which a bar 38 is pivoted at 39. On this bar suitable supports 40 are mounted to receive the card 41 bearing the figures or characters used in the eye-testing operation. This slide 36 may be moved back and forth on the bar to any desired position thereon.

In various ways the details of construction herein shown and described may be modified and still be within the scope of my invention.

I claim as my invention:

1. An eye-testing machine comprising a wheel having a series of eye-testing frames radially mounted therein and lenses for said frames, an arm radially mounted with respect to said wheel and having lenses and eye-pieces therefor to register with the lens of said wheel when it is revolved, and a frame mounted to move in a plane parallel with the plane of said wheel into and from the field of said lenses.

2. An eye-testing machine comprising a revolving wheel, lens frames radially mounted therein and lenses therefor, an arm radially mounted with respect to said wheel and having lenses and eye pieces therefor to register with the lens of said wheel when it is revolved, and a hinged frame mounted to swing in a plane parallel with the plane of said wheel into and from the field of said lenses.

3. An eye-testing machine comprising a revolving wheel, lens frames radially mounted therein and lenses therefor, an arm radially mounted with respect to said wheel and having an end portion extending around the periphery of said wheel, a lens frame hinged to said arm extension and adapted to swing in a plane at right angles to the plane of said wheel, an eye piece and lenses therefor mounted in said frame to register with said radial frame lenses and with the lenses of said hinged frame.

4. An eye-testing machine comprising a revolving wheel, lens frames radially mounted therein and lenses therefor, an arm radially mounted with respect to said wheel and in a plane parallel therewith and having holes and lenses therefor to register with the lenses of said frame, eye pieces for the lenses of said arm, a frame carried by said arm on the other side of said wheel from said eye pieces, lenses mounted in said last named frame and movable therewith into or out of the plane of the lenses of said wheel frames.

5. An eye-testing machine comprising a revolving wheel, lens frames radially mounted therein and lenses therefor, an arm radially mounted with respect to said wheel and having lenses mounted therein to register with the lenses of said frame, a frame mounted on the opposite side of said wheel from said arm and connected with said arm and having lens carriers provided with a plurality of sockets and lenses for said sockets.

6. An eye-testing machine comprising an upright standard, a wheel having a hub and rim and a series of spokes radiating from said hub to said rim, lens frames mounted on the outer ends of said spokes, lenses mounted in pairs in said frames, an arm mounted on said hub concentric with said wheel to revolve in a plane parallel with the plane of said wheel, and a pair of lenses mounted in the outer portion of said arm to register with the lenses of said spokes, said arm being free to revolve independently of said wheel.

7. An eye-testing machine comprising a revolving wheel having lenses mounted therein, an arm mounted to revolve in a plane parallel with the plane of said wheel and concentric therewith, and a lens frame pivoted on said arm and having lenses to register with the lenses of said wheel.

8. An eye-testing machine comprising a revolving wheel having lenses radially mounted therein, an arm concentric with said wheel and mounted for independent adjustment thereof, said arm being normally stationary, and lenses mounted in said arm in a plane parallel substantially with the plane of said wheel past which arm the lenses of said wheel move as it is revolved.

9. An eye-testing machine comprising a revolving wheel, lenses radially mounted therein, an arm concentrically mounted with respect to said wheel and in a plane parallel with the plane thereof, said arm being normally stationary, lens carriers mounted on said arm and movable back and forth, into and out of the field of the wheel lenses, and lenses mounted in said carriers and adapted to register with the lenses of said wheel.

10. An eye-testing machine comprising a wheel having a series of eye-testing frames radially mounted therein and lenses for said frames, an arm radially mounted with respect to said wheel and having lenses in a plane parallel substantially to the plane of said wheel to register successively with the lenses of said wheel when it is revolved.

In witness whereof, I have hereunto set my hand this 17th day of May 1915.

JOHN A. L. WALMAN.

Copies of this patent may be obtained for five cents each, by addressing the "Commissioner of Patents, Washington, D. C."